United States Patent
Larner et al.

(10) Patent No.: US 11,667,222 B1
(45) Date of Patent: Jun. 6, 2023

(54) VEHICLE MECHANISMS THAT ALTER A VEHICLE CABIN TO REDUCE MOTION SICKNESS

(71) Applicant: WAYMO LLC, Mountain View, CA (US)

(72) Inventors: Daniel Lynn Larner, San Jose, CA (US); Keith Hutchings, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 673 days.

(21) Appl. No.: 16/522,194

(22) Filed: Jul. 25, 2019

Related U.S. Application Data (60) Provisional application No. 62/715,936, filed on Aug. 8, 2018.

(51) Int. Cl.
- *B60N 2/50* (2006.01)
- *B60N 2/02* (2006.01)

(52) U.S. Cl.
CPC ........... *B60N 2/501* (2013.01); *B60N 2/0224* (2013.01); *B60N 2/502* (2013.01); *B60N 2002/0268* (2013.01)

(58) Field of Classification Search
CPC ......... B60W 60/0013; B60W 2540/22; B60W 2540/106; B60W 2520/00; B60W 2540/223; B60N 2/501; B60N 2/0224; B60N 2/502; B60N 2002/0268
See application file for complete search history.

(56) References Cited

U.S. PATENT DOCUMENTS

| | | | |
|---|---|---|---|
| 5,882,084 A | 3/1999 | Verellen | |
| 2006/0200287 A1* | 9/2006 | Parison | B60N 2/501 701/1 |
| 2015/0287325 A1* | 10/2015 | Drescher | B60W 50/14 340/435 |
| 2016/0221475 A1* | 8/2016 | Sugiyama | B60N 2/14 |
| 2018/0162186 A1* | 6/2018 | Anderson | B60G 17/016 |
| 2018/0244173 A1* | 8/2018 | Toyoda | B60N 2/0232 |
| 2018/0268695 A1* | 9/2018 | Agnew | B60W 30/09 |
| 2018/0345841 A1* | 12/2018 | Prokhorov | B60N 3/008 |
| 2019/0359084 A1* | 11/2019 | Ellis | B60N 2/01 |

FOREIGN PATENT DOCUMENTS

| | | | |
|---|---|---|---|
| DE | 102008008677 A1 | 8/2009 | |
| EP | 1777135 A1 * | 4/2007 | B60W 30/16 |
| WO | 2017087883 A1 | 5/2017 | |

OTHER PUBLICATIONS

EP1777135A1—English trans, MAN Nutzfahrzeuge Aktiengesellschaft (EP 1777135A1) (hereinafter referred to as Man) (Year: 2007).*
"ClearMotion—Home," www.clearmotion.com, accessed Apr. 12, 2018.

* cited by examiner

*Primary Examiner* — Abby Y Lin
*Assistant Examiner* — Renee LaRose
(74) *Attorney, Agent, or Firm* — Botos Churchill IP Law (57) ABSTRACT

The disclosure provides for a system that includes one or more cabin components in a vehicle and one or more computing devices of the vehicle. The one or more computing devices are configured to determine that a vehicle will have an acceleration in a first direction at a future time and an acceleration time associated with the acceleration of the vehicle, alter the one or more cabin components of the vehicle before the acceleration time, and adjust the one or more cabin components of the vehicle based on the acceleration of the vehicle over time.

20 Claims, 7 Drawing Sheets

VEHICLE MECHANISMS THAT ALTER A VEHICLE CABIN TO REDUCE MOTION SICKNESS

CROSS REFERENCE TO RELATED APPLICATIONS

This application claims the benefit of the filing date of U.S. Provisional Patent Application No. 62/715,936 filed Aug. 8, 2018, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and a vehicle maneuvers itself to that location.

Some passengers may suffer from motion sickness while in a vehicle. As an example, symptoms of motion sickness may include nausea, headache, and upset stomach. Therefore, a passenger with motion sickness may experience a level of discomfort, which can make a trip in a vehicle unpleasant for that passenger as well as any other passengers in the vehicle.

BRIEF SUMMARY

Aspects of the disclosure provide for a system. The system includes one or more cabin components in a vehicle, and one or more computing devices of the vehicle. The one or more computing devices are configured to determine that a vehicle will have an acceleration in a first direction at a future time and an acceleration time associated with the acceleration of the vehicle, alter the one or more cabin components of the vehicle before the acceleration time, and adjust the one or more cabin components of the vehicle based on the acceleration of the vehicle over time.

In one example, the one or more computing devices are configured to determine the acceleration time as a point in time where the acceleration of the vehicle is predicted to start or as a point in time where the acceleration of the vehicle exceeds a minimum threshold acceleration. In another example, the one or more cabin components include a seat of the vehicle that has a default position, and a gimbal configured to control the seat. In this example, the one or more computing devices are configured to alter the one or more cabin components of the vehicle before the acceleration time by tilting a top of the seat toward the first direction from the default position to a tilted position using the gimbal, and adjust the one or more cabin components of the vehicle based on the acceleration of the vehicle over time by moving the seat from the tilted position towards the default position using the gimbal. Also in this example, the one or more computing devices are configured to move the seat from the tilted position towards the default position at a rate corresponding to an acceleration rate over time. The one or more computing devices in this example are optionally configured to move the seat from the tilted position towards the default position by dampening the movement of the seat as the seat approaches the default position.

In a further example, the one or more cabin components include a seat of the vehicle and a vibration mechanism configured to vibrate the seat. In this example, the one or more computing devices are configured to alter the one or more cabin components of the vehicle before the acceleration time by vibrating the seat using the vibration mechanism, and adjust the one or more cabin components of the vehicle based on the acceleration of the vehicle over time by adjusting an intensity of the vibration over time based on a rate of acceleration of the vehicle. The one or more computing devices in this example are optionally configured to adjust the one or more cabin components by increasing an intensity of the vibration as the rate of acceleration increases. Additionally or alternatively, the one or more computing devices in this example are optionally further configured to provide a constant, non-zero amount of vibration to the seat during times of zero acceleration.

In yet another example, the one or more cabin components include an indication system of the vehicle. In this example, the one or more computing devices are configured to alter the one or more cabin components of the vehicle before the acceleration time by providing an visual, audio, or haptic indication using the indication system, and adjust the one or more cabin components of the vehicle based on the acceleration of the vehicle over time by adjusting the visual, audio, or haptic indication based on a rate of acceleration of the vehicle. Optionally, the indication system of the vehicle in this example includes one or more lights, and the one or more computing devices are configured to provide the visual, audio, or haptic indication by increasing an amount of light from the one or more lights before the acceleration time. Additionally or alternatively, the indication system of the vehicle in this example includes one or more speakers, and the one or more computing devices am configured to provide the visual, audio, or haptic indication by emitting a sound from the one or more speakers before the acceleration time. Also in this example, the one or more computing devices are optionally configured to alter the one or more cabin components at least approximately 0.5 seconds before the acceleration time to compensate for a perception delay of a passenger.

In a still further example, the system includes the vehicle.

Other aspects of the disclosure provide for a method for adjusting one or more cabin components of a vehicle. The method includes determining, by one or more computing devices, that a vehicle will have an acceleration in a first direction at a future time and an acceleration time associated with the acceleration of the vehicle; altering, by the one or more computing devices, the one or more cabin components of the vehicle before the acceleration time; and adjusting, by the one or more computing devices, the one or more cabin components of the vehicle based on the acceleration of the vehicle over time.

In one example, determining the acceleration time includes determining a point in time where the acceleration of the vehicle is predicted to start or as a point in time where the acceleration of the vehicle exceeds a minimum threshold acceleration. In another example, the one or more cabin components include a seat of the vehicle that has a default position, and a gimbal configured to control the seat. In this example, the method also includes altering the one or more cabin components of the vehicle before the acceleration time by tilting a top of the seat toward the first direction from the default position to a tilted position using the gimbal; and adjusting the one or more cabin components of the vehicle based on the acceleration of the vehicle over time by moving the seat from the tilted position towards the default position using the gimbal.

In a further example, the one or more cabin components include a seat of the vehicle and a vibration mechanism configured to vibrate the seat. In this example, the method also includes altering the one or more cabin components of the vehicle before the acceleration time by vibrating the seat using the vibration mechanism; and adjusting the one or more cabin components of the vehicle based on the acceleration of the vehicle over time by adjusting an intensity of the vibration over time based on a rate of acceleration of the vehicle. In yet another example, the one or more cabin components include an indication system of the vehicle. In this example, the method also includes altering the one or more cabin components of the vehicle before the acceleration time by providing an visual, audio, or haptic indication using the indication system; and adjusting the one or more cabin components of the vehicle based on the acceleration of the vehicle over time by adjusting the visual, audio, or haptic indication based on a rate of acceleration of the vehicle.

In a still further example, altering the one or more cabin components includes altering the one or more cabin components at least approximately 0.5 seconds before the acceleration time to compensate for a perception delay of a passenger.

Further aspects of the disclosure provide for a non-transitory, tangible computer-readable storage medium on which computer readable instructions of a program are stored. The instructions, when executed by one or more computing devices, cause the one or more computing devices to perform a method for adjusting one or more cabin components of a vehicle. The method includes determining, by one or more computing devices, that a vehicle will have an acceleration in a first direction at a future time and an acceleration time associated with the acceleration of the vehicle; altering, by the one or more computing devices, the one or more cabin components of the vehicle before the acceleration time; and adjusting, by the one or more computing devices, the one or more cabin components of the vehicle based on the acceleration of the vehicle over time.

DETAILED DESCRIPTION

Overview

The technology relates to systems and methods for actively adapting a vehicle environment to increase passenger comfort. The vehicle environment may be controlled based on at least a movement of the vehicle, such as acceleration, deceleration, or turns. Adaptations may include tilting a seat, vibrating a seat, or providing visual, audio, or other haptic indications within the vehicle cabin.

In order to achieve these adaptations, a seat tilting system may be configured to tilt a seat of the vehicle. The system may include a gimbal on which the seat of the vehicle is mounted. The vehicle's computing devices may then be configured to control the gimbal to tilt the seat based on the movement of the vehicle. For instance, the vehicle's computing devices may determine that vehicle will accelerate in at least a first direction at some point in the future and may activate the system in order to tilt the seat from a default position to a tilted position so that a top of the seat is rotated towards the first direction. Then, as the vehicle accelerates or diminishes acceleration in the first direction, the system may be used to move the seat from the tilted position back to the default position.

To achieve a different adaptation, a seat vibration system may be configured to vibrate the seat of the vehicle. The seat vibration system may be used to provide a passenger of the vehicle with anticipatory information about what the vehicle will be doing, such as accelerations. This system may include a vibration mechanism connected to the seat of the vehicle. The vehicle's computing devices may be configured to control the vibration mechanism based on the movement of the vehicle. For instance, the vehicle's computing devices may determine that a vehicle will accelerate in at least a first direction and a rate of acceleration. The vehicle's computing devices may initiate vibration or change the vibration a set time before the vehicle will accelerate or may do so right when acceleration begins. The vibration may be provided to a portion of the seat based on the first direction. As the vehicle accelerates, the vehicle may vary the vibration of the seat based on the rate of acceleration.

For additional adaptations, one or more indication systems that are configured to provide indications within a cabin of the vehicle may be included in the system. For instance, indication systems may include one or more lights, one or more speakers, or one or more wired or wireless connections to a client device. The vehicle's computing devices may then be configured to control the one or more indication systems based on the movement of the vehicle. In particular, the vehicle's computing devices may determine that a vehicle will accelerate in at least a first direction, a rate of acceleration, and an estimated time of the acceleration. The vehicle's computing devices may provide an indication using the one or more indication systems either before or at the estimated time of acceleration or the estimated time that the threshold will be exceeded. The one or more indication systems may be configured to control mechanisms of the vehicle and provide a visual, audio, or haptic indication to a passenger in the vehicle. In other implementations, the indication system may be configured to transmit a signal via the one or more wired or wireless connections to a client computing device that is detected in the vehicle, which then causes the client computing device to provide the indication.

The adaptations may be provided by the vehicle's computing devices a set amount of time before the estimated time of acceleration or the estimated time that the acceleration threshold will be exceeded. This set amount of time may be configured to offset a perception delay of the passenger, which is due to the time it takes for a sensation or stimulus to a person's body to be processed and perceived by the person's mind.

The features described herein may significantly increase passenger comfort. For instance, motion or vibration of the seat and/or the indications in the vehicle cabin may allow a passenger of the vehicle to anticipate and adjust to the movements of the vehicle. As a result, a passenger may experience less motion sickness and may be more able to read or do other activities while in the vehicle. In addition, the system provides enough time for a passenger to take any actions to prepare for the movements of the vehicle, such as bracing or repositioning his or her position, avoiding spilling a beverage, or avoiding dropping food. Overall, the passenger may be able to predict the movements of the vehicle and have an improved sense of control or trust when riding in the vehicle.

Example Systems

Figure 1:
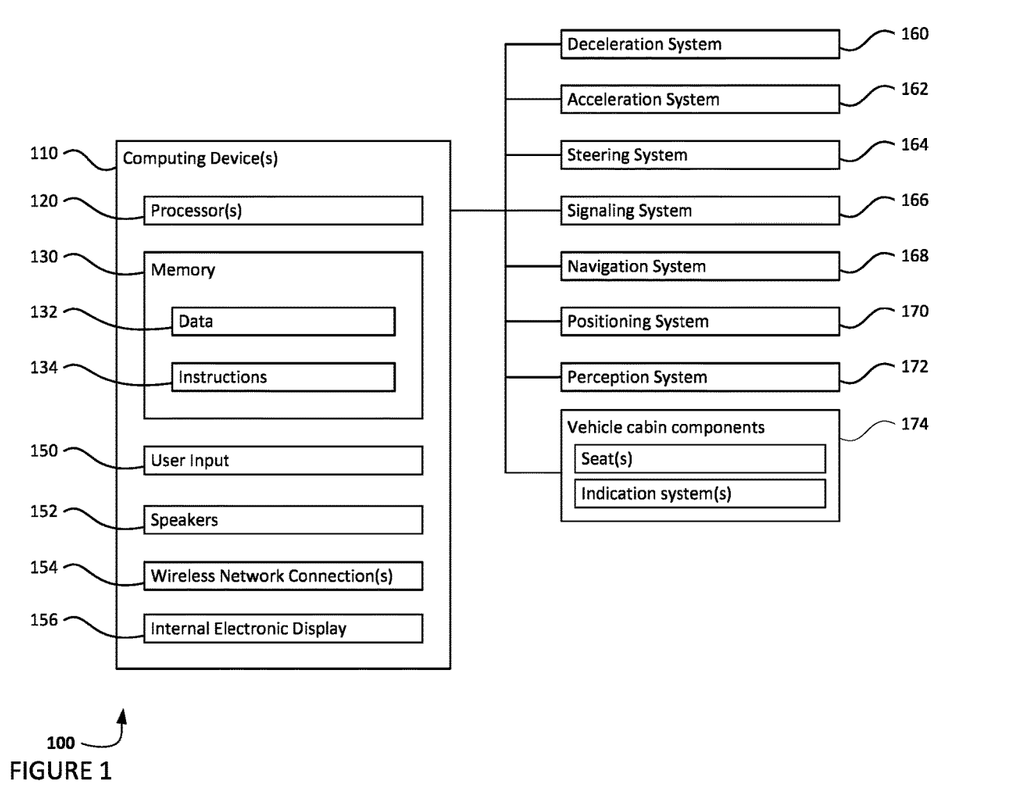
FIG. 1 is a functional diagram of an example vehicle 100 in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle 100 may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle 100 may have one or more computing devices 110 that include one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of the vehicle's computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of the vehicle's computing devices 110. Accordingly, references to a processor or computing device will be understood to include references to a collection of processors or computing devices or memories that may or may not operate in parallel.

The vehicle's computing devices 110 may have all of the components normally used in connection with a computing device such as the processor and memory described above, as well as a user input 150 (e.g., a mouse, keyboard, touch screen and/or microphone), various electronic displays (e.g., a monitor having a screen, a small LCD touch-screen or any other electrical device that is operable to display information), audio output (such as speakers 152), and a wireless network connection 154. In this example, the vehicle 100 includes an internal electronic display 156. In this regard, internal electronic display 156 may be located within a cabin of vehicle 100 and may be used by the vehicle's computing devices 110 to provide information to passengers within the vehicle 100.

In one example, the vehicle's computing devices 110 may be part of an autonomous driving computing system incorporated into vehicle 100. The autonomous driving computing system may capable of communicating with various components of the vehicle 100 as needed in order to control the vehicle 100 in fully autonomous (without input from a driver) as well as semi-autonomous (some input from a driver) driving modes.

When engaged, the vehicle's computing devices 110 may control some or all of these functions of vehicle 100 and thus be fully or partially autonomous. It will be understood that although various systems and the vehicle's computing devices 110 are shown within vehicle 100, these elements may be external to vehicle 100 or physically separated by large distances. In this regard, the vehicle's computing devices 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to the vehicle's computing devices 110, in actuality, these systems may also be incorporated into the vehicle's computing devices 110, again as an autonomous driving computing system for controlling vehicle 100.

As an example, the vehicle's computing devices 110 may interact with deceleration system 160 and acceleration system 162 in order to control the speed of the vehicle 100. Similarly, steering system 164 may be used by the vehicle's computing devices 110 in order to control the direction of vehicle 100. For example, if vehicle 100 configured for use on a road, such as a car or truck, the steering system may include components to control the angle of wheels to turn the vehicle 100. Signaling system 166 may be used by the vehicle's computing devices 110 in order to signal the vehicle's intent to other drivers or vehicles, for example, by lighting turn signals or brake lights when needed.

Navigation system 168 may be used by the vehicle's computing devices 110 in order to determine and follow a route to a location. In this regard, the navigation system 168 and/or data 132 may store map information, e.g., highly detailed maps identifying the shape and elevation of roads, lane lines, intersections, crosswalks, speed limits, traffic signals, buildings, signs, real time traffic information, vegetation, or other such objects and information. Map information may also include information that describes the location of speed limit signs as well as speed limits for sections of road or zones.

Positioning system 170 may be used by the vehicle's computing devices 110 in order to determine the vehicle's relative or absolute position on a map or on the earth. For example, the positioning system 170 may include a GPS receiver to determine the vehicle's latitude, longitude and/or altitude position. Other location systems such as laser-based localization systems, inertial-aided GPS, or camera-based localization may also be used to identify the location of the vehicle 100. The location of the vehicle may include an absolute geographical location, such as latitude, longitude, and altitude as well as relative location information, such as location relative to other cars immediately around it which can often be determined with less noise that absolute geographical location.

The positioning system 170 may also include other detection systems in communication with the vehicle's computing devices 110, such as an orientation or pose detection system 180 (shown in FIG. 2) configured to determine the vehicle's pitch, yaw or roll (or changes thereto) relative to the direction of gravity or a plane perpendicular thereto. Other detection systems may track increases or decreases in speed of the vehicle 100 and the direction of such changes. The provision of location and orientation data as set forth herein may be provided automatically by the detection systems to the vehicle's computing devices 110, other computing devices and combinations of the foregoing.

The perception system 172 may include one or more detection systems in communication with the vehicle's computing devices 110 that are configured for detecting and performing analysis on objects external to the vehicle 100 such as other vehicles, obstacles in the road, traffic signals, signs, trees, etc. The one or more detection systems may include, for example, a short range detection system 182, a long range detection system 184, a blind spot detection system 186, or a radar detection system 188 (shown in FIG. 2). Sensors of these detection systems may include lasers, sonar units, radar units, cameras, or any other detection devices which record data that may be processed by the vehicle's computing devices 110. This data may describe the shape and geographic location coordinates of objects detected in the vehicle's environment. Other sensor data collected by the detection systems may include, for example, reflectivity, speed, trajectory data, etc. of detected objects.

Figure 2:
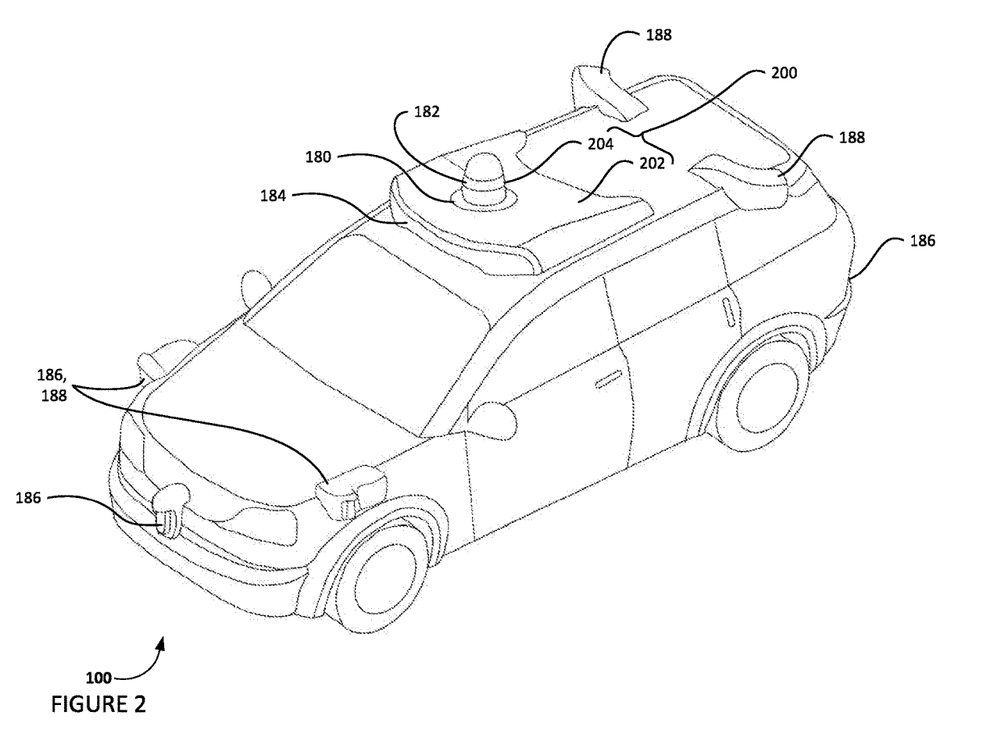
FIG. 2 is an example external view of the vehicle 100 in accordance with aspects of the disclosure.

The various detection systems or sensors of the vehicle 100 described herein may be positioned on or in different portions of the vehicle 100. As shown in FIG. 2, the vehicle 100 may include a positioning box 200 mounted atop a roof of the vehicle 100 or in a different part of the vehicle 100. When mounted atop the roof of the vehicle 100, the positioning box 200 may include a dome that comprises a lower dome portion 202 and an upper dome portion 204 that are both configured to house one or more of the detection systems. The orientation or pose detection system 180 of the positioning system may include an inertial measurement unit located in the lower dome portion 202 of the positioning box 200. The short range detection system 182 may include one or more lidar systems located in the upper dome portion 204. The long range detection system 184 may include one or more lidar systems located in the lower dome portion 202. The blind spot detection system 186 may include one or more lidar systems located in the vicinity of the vehicle's headlights and taillights. The radar detection system 188 may include one or more radar systems located in the vicinity of the vehicle's headlights and at the rear portion of the vehicle's roof. Different arrangements of the detection systems may also be utilized.

The vehicle's computing devices 110 may control the direction and speed of the vehicle by controlling various components. By way of example, the vehicle's computing devices 110 may navigate the vehicle to a destination location completely autonomously using data from the detailed map information and navigation system 168. The vehicle's computing devices 110 may use the positioning system 170 to determine the vehicle's location and perception system 172 to detect and respond to objects when needed to reach the location safely. In order to do so, the vehicle's computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, the vehicle's computing devices 110 may also control the drivetrain of the vehicle in order to maneuver the vehicle autonomously.

Figure 3:
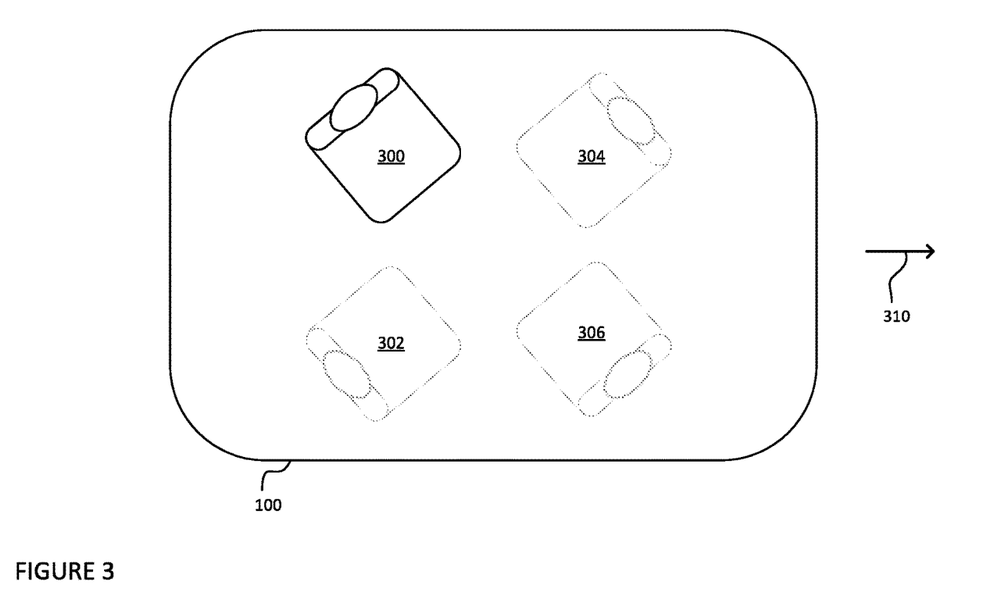
FIG. 3 is an example top-down view of seats in a vehicle in accordance with aspects of the disclosure.

As discussed in more detail below, the vehicle's computing devices 110 may be configured to alter one or more components 174 in the vehicle's cabin based on a timing of the acceleration or deceleration of the vehicle 100. In this regard, the vehicle's computing devices may be in communication with the one or more cabin components 174 of the vehicle. The one or more cabin components 174 may include one or more seats in the vehicle. When the vehicle is in operation, one or more seats of the vehicle may be positioned in a non-traditional arrangement. The one or more seats in the vehicle may be positioned in traditional front-facing arrangements or may be positioned in non-traditional arrangements. For example, as shown in FIG. 3, seats 300, 302, 304, and 306 may be positioned in a circle facing each other in vehicle 100 while vehicle 100 is traveling in direction of arrow 310. Seats 300, 302, 304, and 306 are all not facing the direction of arrow 310 in which vehicle 100 is traveling. The direction indicated by arrow 310 may be a forward direction of the vehicle. A backward direction of the vehicle may be opposite the forward direction. A leftward direction of the vehicle may be a turn from facing the forward direction to the left, or counterclockwise. A rightward direction of the vehicle may be a turn form facing the forward direction to the right, or clockwise.

Figure 4A:
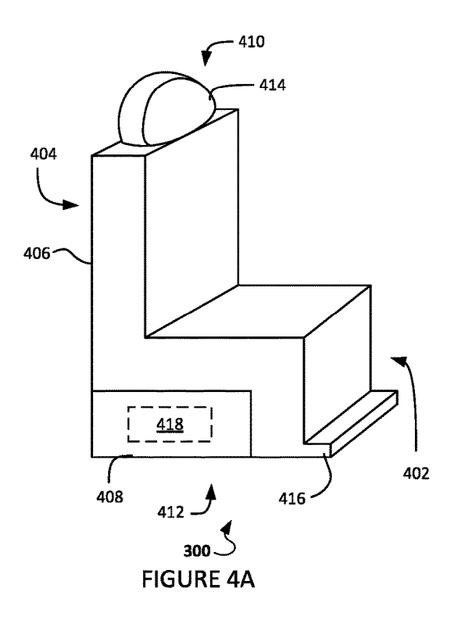
FIGS. 4A-4D are views of an example seat in accordance with aspects of the disclosure.
Figure 4B:
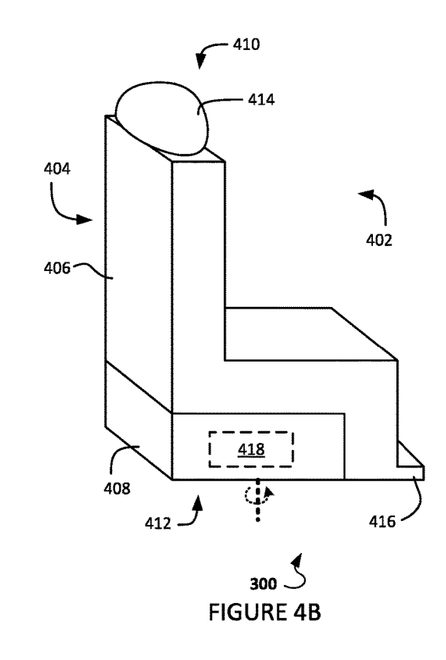

In certain implementations, each of the one or more seats in the vehicle may be configured as shown in FIGS. 4A and 4B. A seat 300 may have a front end 402 and a back end 404. The back end 404 may comprise a back support 406 extending upward from the back end of a base 408 of the seat. Also, the seat may have a top end 410 and a bottom end 412. The top end 410 may be the top of the back support 406 and may include a head rest 414, and the bottom end 412 may be the bottom of the base 408 of the seat and may include a foot rest 416. When a passenger is seated in the seat, he or she may have his or her back in contact with the back support 406 and be facing the front end 402 of the seat with his or her legs arranged over the front end of the base 408. The passenger's feet may be in contact with the foot rest 416. Further, the seat 300 may be capable of reclining at an angled or completely flat position.

Figure 4C:
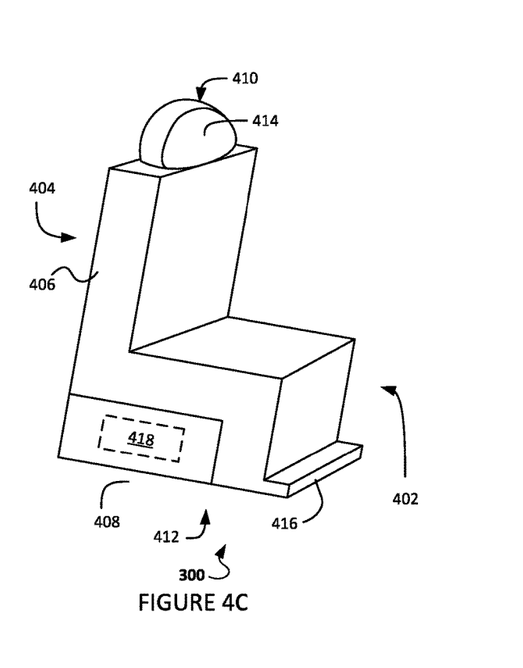
Figure 4D:
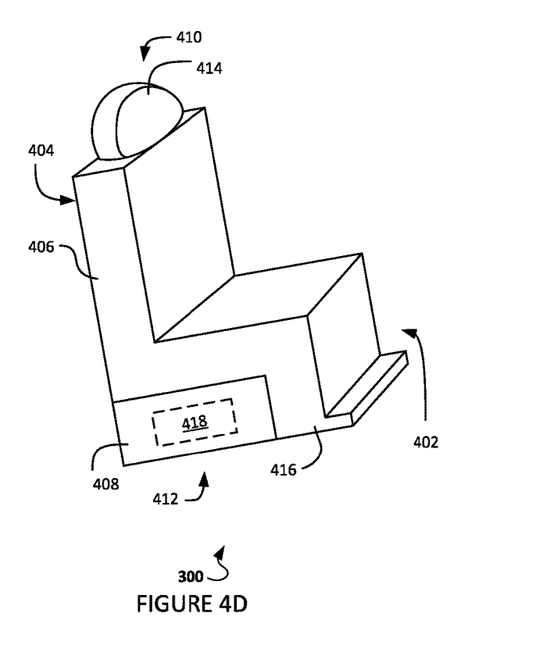

The seat 300 of vehicle 100 may be configured to tilt and/or rotate within the vehicle. The seat may 300 include a seat positioning system 418 configured to tilt or rotate the seat relative to the vehicle. For example, the seat positioning system 418 may include one or more electric motors and a gimbal in or under the base 408 of the seat 300. By changing the position of the gimbal using the one or more electric motors, seat positioning system 418 may tilt the seat 300 in any direction, such as in a forward direction so that a back portion of the base 408 under the back support is raised higher than a front portion of the base 408 more proximal to the foot rest 416, as shown in FIG. 4C, or in a backward direction so that the front portion of the base 408 is raised higher than the back portion, as shown in FIG. 4D. Other directions may include leftward so that a right side of the base 408 is raised higher than a left side of the base 408 or rightward so that the right side is raise higher than the left side. In some implementations, tilting the seat includes tilting the back support 406 of the seat independent from the base of the seat, such as by rotating the back support about a hinge between the back support and the base of the seat 300 in a forward or backward direction.

In addition, the seat positioning system 418 may also be configured to rotate the seat 300 about a vertical axis in the base 408. By rotating about the vertical axis, the seat positioning system 418 may change the direction the seat faces to any direction within a range, such as 360 degrees. For example, the seat positioning system 418 may rotate the seat 300 from forward facing, as shown in FIG. 4A, to 15 degrees counterclockwise from forward facing, as shown in FIG. 4B.

The seat 300 may also be configured to vibrate. For instance, seat 300 may include a seat vibration system that includes a vibration mechanism, such as a small electric motor, connected to the base 408 of the seat. The vibration mechanism may be configured to vibrate the base 408 at different intensities or magnitudes, different frequencies, or varying duty cycles. In some implementations, the seat vibration system may include an array of electric motors arranged in different locations of the seat. Each electric motor of the array may be configured to vibrate independent from the other electric motors of the array, and the arrangement of the array may allow for a portion of the seat to be vibrated independent from other portions of the seat.

Additionally or alternatively, the one or more cabin components 174 in the vehicle cabin may include other visual, audio, or haptic indication systems. For example, an indication system may include one or more lights in the vehicle cabin, one or more speakers in the vehicle cabin, or an air conditioning system for the vehicle cabin. When a client device is in the vehicle's cabin and is in communication with the vehicle's computing devices 110 via the wireless network connection 154 or alternatively a wired connection, the indication system may include the client device to the extent client permissions allow.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to alter one or more cabin components 174 in the vehicle's cabin based on a timing of the acceleration or deceleration of the vehicle 100, the vehicle's computing devices may determine that the vehicle will start to accelerate or decelerate in at least a first direction at a future point in time, or an acceleration time. In some examples, the future point in time may be determined for when the vehicle's acceleration is planned to occur over a period of time, or acceleration period of time, that exceeds a minimum amount of time, such as 5 seconds or more or less. This determination of the acceleration time may or acceleration period be based on a route determined using the navigation system 168 as well as position or orientation data collected by the positioning system 170. In this regard, the acceleration time or acceleration period may be determined for when the vehicle is predicted to be at or approaching a location on the route where acceleration or deceleration is planned, such as proximate to an intersection, a stop sign, a traffic light, or a planned turn.

In some scenarios, the acceleration time or acceleration period may also be determined based on objects detected by the perception system 172. For example, the perception system 172 may detect a position and trajectory of an object that intersects the route of the vehicle, and the vehicle's computing devices 110 may determine the acceleration time or acceleration period based on the intersection location to avoid a collision between the vehicle 100 and the object. The perception system 172 may also detect a position and movement of an object in front of, behind, or next to the vehicle in the flow of traffic, and may determine the acceleration time or acceleration period based on the movement of the object and the flow of traffic. In some examples, the vehicle's computing devices may also determine an amount of acceleration at the acceleration time and/or amounts of acceleration over the acceleration period.

Alternatively, the acceleration time or acceleration period may be determined by the vehicle's computing devices 110 as the point in time when the acceleration of the vehicle 100 is predicted to exceed a minimum threshold acceleration. The minimum threshold acceleration may be, for example, approximately 0.1 miles/s/s (i.e., approximately 6 miles per hour per second), or more or less.

The vehicle's computing devices 110 may alter the one or more cabin components 174 by tilting a seat of the vehicle, such as seat 300, before the determined acceleration time. The vehicle's computing devices 110 may tilt the seat from a default position to a tilted position using the seat positioning system 418. Namely, the vehicle's computing devices 110 may control the seat positioning system 418 so that a top of the seat is rotated towards the first direction, or the direction of the acceleration. An angle of the tilted position from the default position may be determined by the vehicle's computing devices 110 based on the amount of acceleration or the acceleration period. For instance, for greater amounts of acceleration or longer acceleration periods, the tilted position may be a greater angular distance from the default position. Similarly, for smaller amounts of acceleration or shorter acceleration periods, the tilted position may be a smaller angular distance from the default position. In some implementations, there may be a set maximum angle for the angle of the tilted position from the default position for increasing passenger comfort. For example, the set maximum angle may be 30 degrees from the default position, or more or less.

For linear accelerations, the vehicle's computing devices 110 may determine that the tilted position is at an angle in the direction of the acceleration, the angle being defined by the equation:

$$\text{angle} = \arctan(\text{acceleration}/\text{gravity}).$$

For example, when the vehicle 100 will accelerate from 0 mph (such as at a stop sign) to 25 mph over 5 seconds, or an acceleration of 5 miles per hour per second. The angle of the tilted position may therefore be determined to be at least approximately 12.8 degrees.

For turns, the vehicle's computing devices 110 may determine the tilted position is at an angle in the direction of the acceleration, the angle being defined by the equation:

$$\text{angle} = \arctan(\text{velocity}^2/(\text{radius} \ast \text{gravity})).$$

Figure 5:
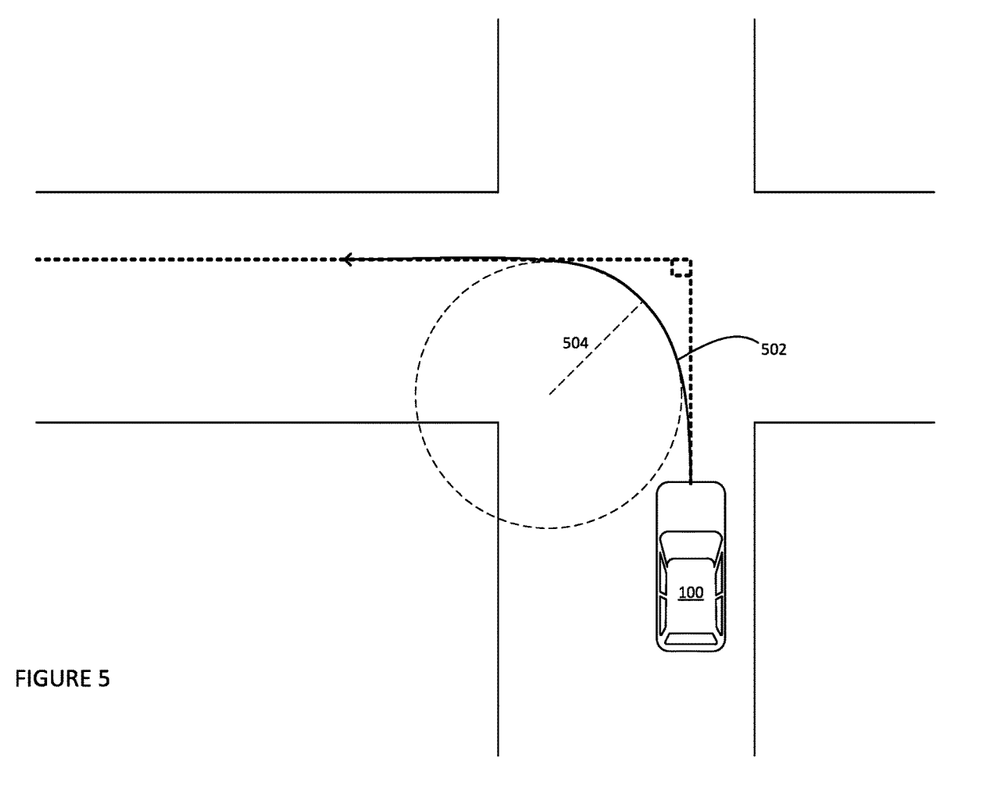
FIG. 5 is an example situational diagram in accordance with aspects of the disclosure.

For example, the vehicle's computing devices 110 may determine that the vehicle will travel at approximately 15 mph around a 50-foot radius left turn through 90 degrees, shown by the left turn arrow 502 and radius 504 in FIG. 5, and therefore will accelerate in a leftward direction. In this example, the angle may therefore be at least approximately 17 degrees. The vehicle's computing devices 110 may tilt a top of the seat 17 degrees to the left before the vehicle enters the left turn. When the vehicle will travel 20 mph around the same left turn, the angle may be determined to be at least approximately 28 degrees.

The seat may be tilted to the tilted position a set amount of time before the determined acceleration time. The set amount of time may be, for example, at least 1 second, or more or less, before the determined acceleration time. In addition, the seat may be tilted in gradual manner that is less perceptible to a passenger. For example, the seat may be tilted at a rate of 2 degrees per second, or more or less.

Then, as the vehicle's computing devices 110 accelerate the vehicle 100 in the first direction, the vehicle's computing devices 110 may move the seat using the seat positioning system from the tilted position back to the default position. The speed at which the seat is moved back to the default position may correspond with an amount of acceleration or the acceleration period. For example, when the vehicle travels at a first acceleration rate, the seat may be moved at a first speed. When the vehicle travels at a second acceleration rate that is faster than the first acceleration rate, the seat may be moved at a second speed that is faster than the first speed. Conversely, when the vehicle accelerates at a third acceleration rate that is slower than the first acceleration rate, the seat may be moved at a third speed that is slower than the first speed. In some implementations, the rate of change of acceleration may also be used to modulate the speed at which the seat is moved, such as moving faster when the rate of change of acceleration is increasing and moving slower when the rate of change of acceleration is decreasing. The seat may further be moved from the tilted position to the default position in a length of time that corresponds with the acceleration period. In some instances, the movement from the tilted position to the default position may also be dampened or controlled in a manner in order to prevent the seat from swinging past the default position.

Additionally or alternatively, the vehicle's computing devices 110 may rotate the seat about the vertical axis in the base 408 to from the default position to a rotated position and back to the default position to counteract acceleration when the vehicle makes a turn. The rotated position may be an amount of rotation counterclockwise or clockwise from the default position. The amount of rotation may be based on an angle of the turn. For example, the amount of rotation may be the same as the angle of the turn or a fraction of the angle of the turn, such as half of the angle of the turn. There also may be a maximum amount of rotation, such as 45 degrees, or more or less. For a 90 degree left turn, as shown in FIG. 5, the seat may be rotated 90 degrees counterclockwise to match the 90 degree left turn, or 45 degrees counterclockwise to match half of the 90 degree left turn or the 45 degree maximum angle. The vehicle's computing devices 110 may rotate the seat to the rotated position In addition or alternatively, an entire passenger compartment may be configured to move, as described above, rather than only the seat of the vehicle. For instance, a gimbal may be configured to move the entire passenger compartment, including the seat of the vehicle.

The vehicle's computing devices 110 also may alter the one or more components 174 by vibrating a seat of the vehicle, such as seat 300, before the determined acceleration time to provide a passenger of the vehicle with anticipatory information about what the vehicle will be doing. The vehicle's computing devices 110 may be configured to control the vibration mechanism to vibrate the seat based on the movement of the vehicle, such as an amount of acceleration or a direction of acceleration. In some examples, a select portion of the seat may be vibrated based on the anticipated direction of acceleration, such as the portion of the seat positioned towards the direction of acceleration. For instance, only a front portion of the seat may be vibrated when the vehicle is predicted to accelerate in the direction the front portion of the seat is facing, and only a back portion of the seat may be vibrated when the vehicle is predicted to accelerate in the direction the back portion of the seat is facing. In other examples, different portions of the seat may be vibrated in turn in a cycle by controlling the vibration of each electric motor of the array in the vibration mechanism in a cycle. For instance, the vibration mechanism may vibrate the front portion of the seat, then a middle portion of the seat between the front and back portion, then the back portion of the seat in turn. This vibration sequence may be repeated. The time for a single run of the vibration sequence may be the duty cycle.

The vehicle's computing devices 110 may initiate vibration or change the intensity, frequency, or duty cycle of the vibration a set amount of time before the acceleration time, such as 0.5 seconds or more or less to offset perception delay of the passenger, or may do so right when acceleration begins. The perception delay may be due to the time it takes for a sensation or stimulus to a person's body to be processed and perceived by the person's mind.

As the vehicle's computing devices 110 accelerate the vehicle, at least one vibration characteristic of the seat may be varied based on the rate of acceleration over the acceleration period. For example, for a greater rate of acceleration, the vehicle's computing devices may increase the intensity, frequency, and/or duty cycle of the vibration of the seat. For a lower rate of acceleration, the vehicle's computing devices 110 may decrease the intensity, frequency, and/or duty cycle of the vibration of the seat. In some examples, the vehicle's computing devices may provide no vibration to the seat during times of zero or low acceleration. In other examples, the vehicle's computing devices 110 may provide a constant, non-zero amount of vibration to the seat during times of zero or low acceleration.

In some examples, the vehicle's computing devices 110 may alter the one or more cabin components 174 by providing visual, audio, or haptic indications using the one or more indication systems of the vehicle 100 before the determined acceleration time to provide a passenger of the vehicle with anticipatory information about what the vehicle will be doing. The vehicle's computing devices 110 may be configured to control the one or more indication systems based on the movement of the vehicle, such as an amount of acceleration. The vehicle's computing devices 110 may provide an indication using the one or more indication systems a set amount of time before the acceleration time such as 0.5 seconds or more or less to offset perception delay of the passenger, or may do so right when acceleration begins. The indication in this example may include adjusting a light in the vehicle cabin, providing a sound in the vehicle cabin, providing vibrations to a passenger in the vehicle, providing air flow to a passenger in the vehicle, providing visual cues via a display in the vehicle, such as the windshield, or any other indication perceptible to a passenger in the vehicle's cabin. An example of the visual cues may be a translucent symbol displayed on the windshield to indicate upcoming vehicle movement, such as an arrow indicating upcoming direction of acceleration with a size of the arrow or a color of the arrow indicating an anticipated magnitude of the acceleration.

Indications may be provided using the one or more cabin components 174 of the vehicle or vehicle accessories that are worn by or otherwise in contact with the passenger of the vehicle. Vehicle accessories may include a headphone, a headband, a bracelet, a ring, a seatbelt-integrated haptic device, or the like. The vehicle's computing devices 110 may be configured to control these types of vehicle accessories via the one or more wireless network connections 154 or a wired connection.

In other implementations, the vehicle's computing devices 110 may be configured to transmit a signal via the one or more wireless network connections 154 or a wired connection to a client computing device that is detected in the vehicle 100, which then causes the client computing device to provide the indication. The signal may include instructions for providing the indication from the client computing device, such as, for example, an increase in light emitted from a flash, an screen, or other lighting component of the client computing device, sound emitted using a speaker of the client computing device, a vibration of the client computing device, or other type of indication using the systems of the client computing device. The transmitted signal in this example may cause the client computing device to adjust a light, play a sound, or vibrate. In another example, the transmitted signal may cause the client computing device to display a translucent symbol to indicate upcoming vehicle movement, such as an arrow indicating upcoming direction of acceleration with a size of the arrow or a color of the arrow indicating an anticipated magnitude of the acceleration.

The indication may be provided by the vehicle's computing devices with a display time which may include a delay, such as 0.5 seconds or more or less before the acceleration time to offset a perception delay of the passenger, or may do so right when acceleration starts. In addition, the indication may be adjusted over time based on changes in the rate of acceleration. For example, the intensity of the light, sound, or vibration may be increased or decreased as the rate of acceleration increases or decreases.

Figure 6:
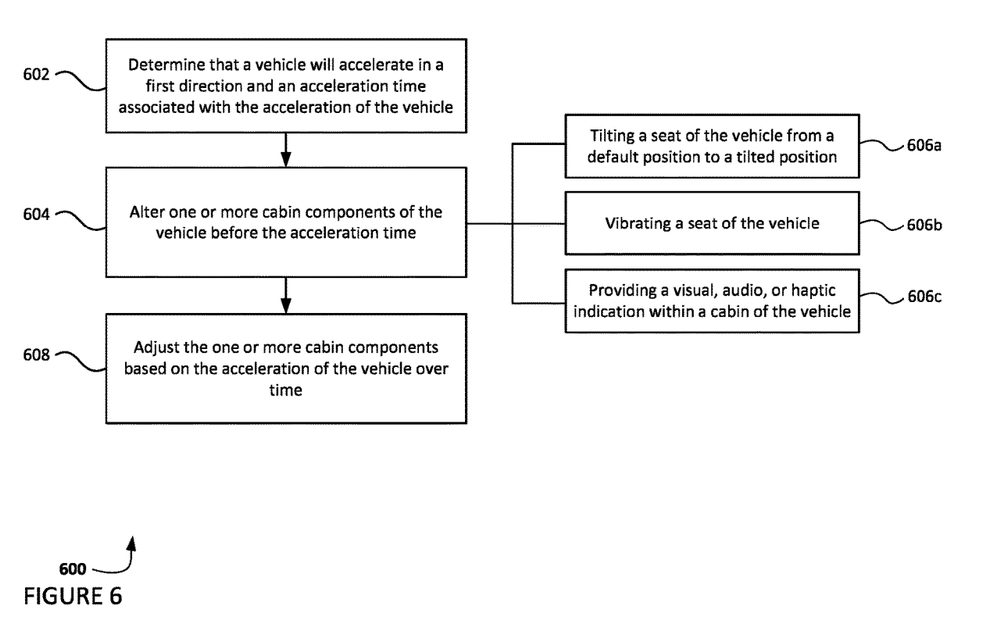
FIG. 6 is another example flow diagram for determining a route and a driving style in accordance with aspects of the disclosure.

FIG. 6 is an example flow diagram 600 including a method for altering a vehicle cabin to reduce motion sickness in accordance with some of the aspects described above. The method may be performed by the one or more computing devices 110 of the vehicle. While FIG. 6 shows blocks in a particular order, the order may be varied and that multiple operations may be performed simultaneously. Also, operations may be added or omitted.

At block 602, it may be determined that a vehicle will accelerate in a first direction. The first direction may be relative to a seat in the vehicle, such as forward, backward, leftward, rightward, another direction, or a combination of directions. In addition, an acceleration time associated with the acceleration of the vehicle may be determined. The acceleration time may be a point in time when the acceleration of the vehicle is predicted to start or a point in time when the acceleration of the vehicle is predicted to exceed a minimum threshold acceleration.

At block 604, one or more cabin components of the vehicle may be altered before the acceleration time. As shown in blocks 606a, 606b, and 606c, the alteration of the one or more cabin components may include tilting a seat of the vehicle from a default position to a tilted position (block 606a), vibrating a seat of the vehicle (block 606b), or providing a visual, audio, or haptic indication within a cabin of the vehicle (block 606c). Tilting the seat may be performed using a seat positioning system in communication with the vehicle's computing devices 110. In the tilted position, a top end of the seat and a back support at an angle to the default position. The seat may rotated in addition to or alternatively to the tilting the seat. Vibrating the seat of the vehicle may be performed using a seat vibration system in communication with the vehicle's computing devices 110. Providing a visual, audio, or haptic indication within a cabin of the vehicle may be performed using one or more components of the vehicle, such as one or more lights configured to emit a light indication, one or more speakers configured to emit a sound indication, or an air conditioning system configured to output air indication. In addition or alternatively, providing a visual, audio, or haptic indication within a cabin of the vehicle may be performed using a client computing device that is detected in the vehicle via the one or more wireless network connection or a wired connection. The vehicle's computing devices 110 may send instructions to the client computing device to cause the client computing device to emit a light, emit a sound, provide a vibration, or provide another type of indication using one or more components of the client computing device.

At block 608, the one or more cabin components may be adjusted based on the acceleration of the vehicle over time. For example, the seat of the vehicle may be moved from the tilted position to the default position as the vehicle accelerates in the first direction. In another example, the seat of the vehicle may be vibrated at different intensities, frequencies, and/or duty cycles based on an amount of acceleration over time. The intensity, frequency, and/or duty cycle of the vibration may increase or decrease as the acceleration increases or decreases. In a further example, the intensity of the visual, audio, or haptic indication within the cabin of the vehicle may be increased or decreased as the acceleration of the vehicle increases or decreases.

In some alternative embodiments, the vehicle's computing devices 110 may move the seat of the vehicle from the default position to the tilted position and back at different times in relation to the acceleration time. For example, the seat may be moved from the default position to the tilted position starting from the acceleration time through the acceleration period as the vehicle accelerates in the first direction, and the seat may be moved from the tilted position back to the default position when the acceleration in the first direction decreases.

The features described herein may significantly increase passenger comfort. For instance, motion or vibration of the seat and/or the indications in the vehicle cabin may allow a passenger of the vehicle to anticipate and adjust to the movements of the vehicle. As a result, a passenger may experience less motion sickness and may be more able to read or do other activities while in the vehicle. In addition, the system provides enough time for a passenger to take any actions to prepare for the movements of the vehicle, such as bracing or repositioning his or her position, avoiding spilling a beverage, or avoiding dropping food. Overall, the passenger may be able to predict the movements of the vehicle and have an improved sense of control or trust when riding in the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   one or more cabin components in a vehicle; and
   one or more computing devices of the vehicle, the one or more computing devices configured to:
      determine (1) an acceleration of the vehicle in a first direction and (2) an acceleration time associated with the determined acceleration, the acceleration time being a future point in time where the determined acceleration is predicted to start, and the acceleration time being determined based on a position and trajectory of an object that intersects a route of the vehicle;
      alter the one or more cabin components of the vehicle before the acceleration time; and
      adjust the one or more cabin components of the vehicle based on the acceleration of the vehicle over time.

2. The system of claim 1, wherein the one or more computing devices are configured to determine the acceleration time as a point in time where the acceleration of the vehicle exceeds a minimum threshold acceleration.

3. The system of claim 1, wherein the one or more cabin components include a seat of the vehicle, the seat having a default position, and a gimbal configured to control the seat; and
   wherein the one or more computing devices are configured to:
      alter the one or more cabin components of the vehicle before the acceleration time by tilting a top of the seat toward the first direction from the default position to a tilted position using the gimbal; and
      adjust the one or more cabin components of the vehicle based on the acceleration of the vehicle over time by moving the seat from the tilted position towards the default position using the gimbal.

4. The system of claim 3, wherein the one or more computing devices are configured to move the seat from the tilted position towards the default position at a rate corresponding to an acceleration rate over time.

5. The system of claim 3, wherein the one or more computing devices are configured to move the seat from the tilted position towards the default position by dampening a movement of the seat as the seat approaches the default position.

6. The system of claim 1, wherein the one or more cabin components include a seat of the vehicle and a vibration mechanism configured to vibrate the seat; and
   wherein the one or more computing devices are configured to:
      alter the one or more cabin components of the vehicle before the acceleration time by vibrating the seat using the vibration mechanism; and
      adjust the one or more cabin components of the vehicle based on the acceleration of the vehicle over time by adjusting an intensity of the vibration over time based on a rate of acceleration of the vehicle.

7. The system of claim 6, wherein the one or more computing devices are configured to adjust the one or more cabin components by increasing an intensity of the vibration as the rate of acceleration increases.

8. The system of claim 6, wherein the one or more computing devices are further configured to provide a constant, non-zero amount of vibration to the seat during times of zero acceleration.

9. The system of claim 1, wherein the one or more cabin components include an indication system of the vehicle; and
   wherein the one or more computing devices are configured to:
      alter the one or more cabin components of the vehicle before the acceleration time by providing a visual, audio, or haptic indication using the indication system; and
      adjust the one or more cabin components of the vehicle based on the acceleration of the vehicle over time by adjusting the visual, audio, or haptic indication based on a rate of acceleration of the vehicle.

10. The system of claim 9, wherein the indication system of the vehicle includes one or more lights; and
    wherein the one or more computing devices are configured to provide the visual, audio, or haptic indication by increasing an amount of light from the one or more lights before the acceleration time.

11. The system of claim 9, wherein the indication system of the vehicle includes one or more speakers; and
    wherein the one or more computing devices are configured to provide the visual, audio, or haptic indication by emitting a sound from the one or more speakers before the acceleration time.

12. The system of claim 9, wherein the one or more computing devices are configured to alter the one or more cabin components at least approximately 0.5 seconds before the acceleration time to compensate for a perception delay of a passenger.

13. The system of claim 1, further comprising the vehicle.

14. A method for adjusting one or more cabin components of a vehicle, the method comprising:
    determining, by one or more computing devices, (1) an acceleration of the vehicle in a first direction and (2) an acceleration time associated with the determined acceleration, the acceleration time being a future point in time where the determined acceleration is predicted to start, and the acceleration time being determined based on a position and trajectory of an object that intersects a route of the vehicle;
    altering, by the one or more computing devices, the one or more cabin components of the vehicle before the acceleration time; and
    adjusting, by the one or more computing devices, the one or more cabin components of the vehicle based on the acceleration of the vehicle over time.

15. The method of claim 14, wherein determining the acceleration time includes determining a point in time where the acceleration of the vehicle exceeds a minimum threshold acceleration.

16. The method of claim 14, wherein the one or more cabin components include a seat of the vehicle, the seat having a default position, and a gimbal configured to control the seat; and     wherein the method further includes:

altering the one or more cabin components of the vehicle before the acceleration time by tilting a top of the seat toward the first direction from the default position to a tilted position using the gimbal; and         adjusting the one or more cabin components of the vehicle based on the acceleration of the vehicle over time by moving the seat from the tilted position towards the default position using the gimbal.

17. The method of claim 14, wherein the one or more cabin components include a seat of the vehicle and a vibration mechanism configured to vibrate the seat; and     wherein the method further includes:

altering the one or more cabin components of the vehicle before the acceleration time by vibrating the seat using the vibration mechanism; and         adjusting the one or more cabin components of the vehicle based on the acceleration of the vehicle over time by adjusting an intensity of the vibration over time based on a rate of acceleration of the vehicle.

18. The method of claim 14, wherein the one or more cabin components include an indication system of the vehicle; and     wherein the method further comprises:

altering the one or more cabin components of the vehicle before the acceleration time by providing a visual, audio, or haptic indication using the indication system; and         adjusting the one or more cabin components of the vehicle based on the acceleration of the vehicle over time by adjusting the visual, audio, or haptic indication based on a rate of acceleration of the vehicle.

19. The method of claim 14, wherein altering the one or more cabin components includes altering the one or more cabin components at least approximately 0.5 seconds before the acceleration time to compensate for a perception delay of a passenger.

20. A non-transitory, tangible computer-readable storage medium on which computer readable instructions of a program are stored, the instructions, when executed by one or more computing devices, cause the one or more computing devices to perform a method for adjusting one or more cabin components of a vehicle, the method comprising:

determining, by one or more computing devices, (1) an acceleration of the vehicle in a first direction and (2) an acceleration time associated with the determined acceleration, the acceleration time being a future point in time where the determined acceleration is predicted to start, and the acceleration time being determined based on a position and trajectory of an object that intersects a route of the vehicle;

altering, by the one or more computing devices, the one or more cabin components of the vehicle before the acceleration time; and     adjusting, by the one or more computing devices, the one or more cabin components of the vehicle based on the acceleration of the vehicle over time.

* * * * *